(12) United States Patent
Takahashi (10) Patent No.: US 10,742,896 B2
(45) Date of Patent: Aug. 11, 2020

(54) IMAGE PROCESSING APPARATUS, IMAGE PROCESSING METHOD, IMAGE CAPTURING APPARATUS, AND STORAGE MEDIUM FOR PANORAMIC IMAGE COMPOSITION

(71) Applicant: CANON KABUSHIKI KAISHA, Tokyo (JP)

(72) Inventor: Yoichi Takahashi, Machida (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/404,328

(22) Filed: May 6, 2019

(65) Prior Publication Data

US 2019/0356832 A1  Nov. 21, 2019

(30) Foreign Application Priority Data

May 17, 2018   (JP) ................................ 2018-095660

(51) Int. Cl.
| | |
|---|---|
| *H04N 5/235* | (2006.01) |
| *H04N 5/232* | (2006.01) |
| *H04N 5/3745* | (2011.01) |
| *H04N 5/355* | (2011.01) |

(52) U.S. Cl.
CPC ......... *H04N 5/2355* (2013.01); *H04N 5/2353* (2013.01); *H04N 5/23229* (2013.01); *H04N 5/23238* (2013.01); *H04N 5/23299* (2018.08); *H04N 5/355* (2013.01); *H04N 5/37452* (2013.01)

(58) Field of Classification Search
CPC .... H04N 5/144; H04N 5/232; H04N 5/23229; H04N 5/23238; H04N 5/23299; H04N 5/2353; H04N 5/2355; H04N 5/355; H04N 5/37452
See application file for complete search history.

(56) References Cited

U.S. PATENT DOCUMENTS

| | | | | |
|---|---|---|---|---|
| 7,239,805 B2* | 7/2007 | Uyttendaele | .......... | G06T 3/4038 348/218.1 |
| 9,258,453 B2* | 2/2016 | Kato | .................... | H04N 1/3871 |
| 2009/0022421 A1* | 1/2009 | Uyttendaele | .......... | G06T 3/4038 382/284 |

FOREIGN PATENT DOCUMENTS

JP   2012-80432 A   4/2012

* cited by examiner

*Primary Examiner* — Lin Ye
*Assistant Examiner* — Chriss S Yoder, III
(74) *Attorney, Agent, or Firm* — Canon U.S.A., Inc. IP Division

(57) ABSTRACT

An image processing apparatus performs first calculation configured to calculate a conversion coefficient, with respect to images having a same exposure, with respect to a plurality of images, second calculation configured to calculate a conversion coefficient of images having different exposures, positional adjustment configured to execute positional adjustment with respect to the plurality of images by using the conversion coefficient calculated in the second calculation, and composition configured to execute composition with respect to the images to generate a composite image having a dynamic range and a viewing angle wider than the images, and in the second calculation an image used for detection with respect to a part of images from among the plurality of images is newly generated.

13 Claims, 6 Drawing Sheets

IMAGE PROCESSING APPARATUS, IMAGE PROCESSING METHOD, IMAGE CAPTURING APPARATUS, AND STORAGE MEDIUM FOR PANORAMIC IMAGE COMPOSITION

BACKGROUND

Field

One disclosed aspect of the embodiments relates to an image capturing apparatus which creates a panoramic image and particularly relates to an image having a wide dynamic range.

Description of the Related Art

In a case where a scene is to be imaged at a viewing angle including a bright object such as the sun and a dark object such as a shaded building, difference of brightness between the bright object and the dark object is increased. Therefore, if the exposure is adjusted to the object having the specific luminance, overexposure or underexposure arises in the imaged scene. Therefore, there is provided a method of generating an HDR image having a wide dynamic range by capturing images while changing the exposures and correcting positional deviation between the captured images.

Further, there is provided panoramic image capturing processing for creating a panoramic image having a viewing angle wider than a viewing angle of a single captured image. In the processing, images are sequentially captured while moving an image capturing apparatus, and the captured images are panoramically combined to each other with overlapping areas. Because the panoramic image capturing is executed at a very wide viewing angle, difference of brightness between a bright object and a dark object included in the viewing angle will be considerably high. Japanese Patent Application Laid-Open No. 2012-80432 discusses a method of generating a panoramic image having a wide dynamic range, i.e., an HDR panoramic image. In the method, after positional deviation of images captured while changing the exposures is sequentially corrected, HDR composition of the images is executed, and the composite HDR images are combined to each other through panoramic composition.

In a case where HDR composition is to be executed through the method described in Japanese Patent Application Laid-Open No. 2012-80432, correction of positional deviation has to be executed. Therefore, there is provided one method employing template matching. In the method, a motion vector between images is detected through template matching, and positional deviation is corrected by using the detected motion vector. However, in order to correctly acquire the motion vector through template matching, luminance signal values or color signal values of the matching areas in the respective images have to be the same level. Therefore, in a case where the motion vector is to be detected from images having different exposures, an image used for detection of the motion vector having the corrected luminance signal value or color signal value has to be generated in addition to an image used for composition.

However, if an image used for detection is created every time image capturing is executed, a processing load is increased, and a large capacity memory for retaining the images is required. Thus, the cost of the system will be increased. Further, processing time will be also longer. As a result, even if the image capturing processing is completed, it will take time to complete the entire image processing. Therefore, it will take a long waiting time before composition of the image is completed.

SUMMARY

One aspect of the embodiments is directed to an image processing apparatus configured to significantly reduce the number of images used for detection of a moving vector when an HDR panoramic image is to be created.

According to an aspect of the embodiments, an image processing apparatus includes a first calculation unit, a second calculation unit, a positional adjustment unit, and a composition unit. The first calculation unit is configured to calculate a conversion coefficient for executing positional adjustment of images having a same exposure with respect to a plurality of images captured at exposures that are rotationally changed. The second calculation unit, different from the first calculation unit, is configured to calculate a conversion coefficient for executing positional adjustment of images having different exposures with respect to the plurality of images. The positional adjustment unit is configured to execute positional adjustment of two images from among the plurality of images by using the conversion coefficient for executing positional adjustment calculated by the second calculation unit. The composition unit is configured to execute composition with respect to the images on which the positional adjustment is executed by the positional adjustment unit to composite a panoramic image having a dynamic range and a viewing angle wider than those of the images. When a conversion coefficient of images is to be calculated with respect to a part of images from among the plurality of images, the second calculation unit newly generates an image used for detection having an exposure that is the same as an exposure of an image positionally adjusted to the image by using an exposure of the image, calculates a conversion coefficient by using the image used for detection, and calculates a conversion coefficient for executing positional adjustment with respect to images other than the part of images from among the plurality of images based on the conversion coefficient calculated by the first calculation unit.

Further features of the disclosure will become apparent from the following description of exemplary embodiments with reference to the attached drawings.

DESCRIPTION OF THE EMBODIMENTS

Hereinafter, an exemplary embodiment will be described in detail with reference to the appended drawings.

Figure 1:
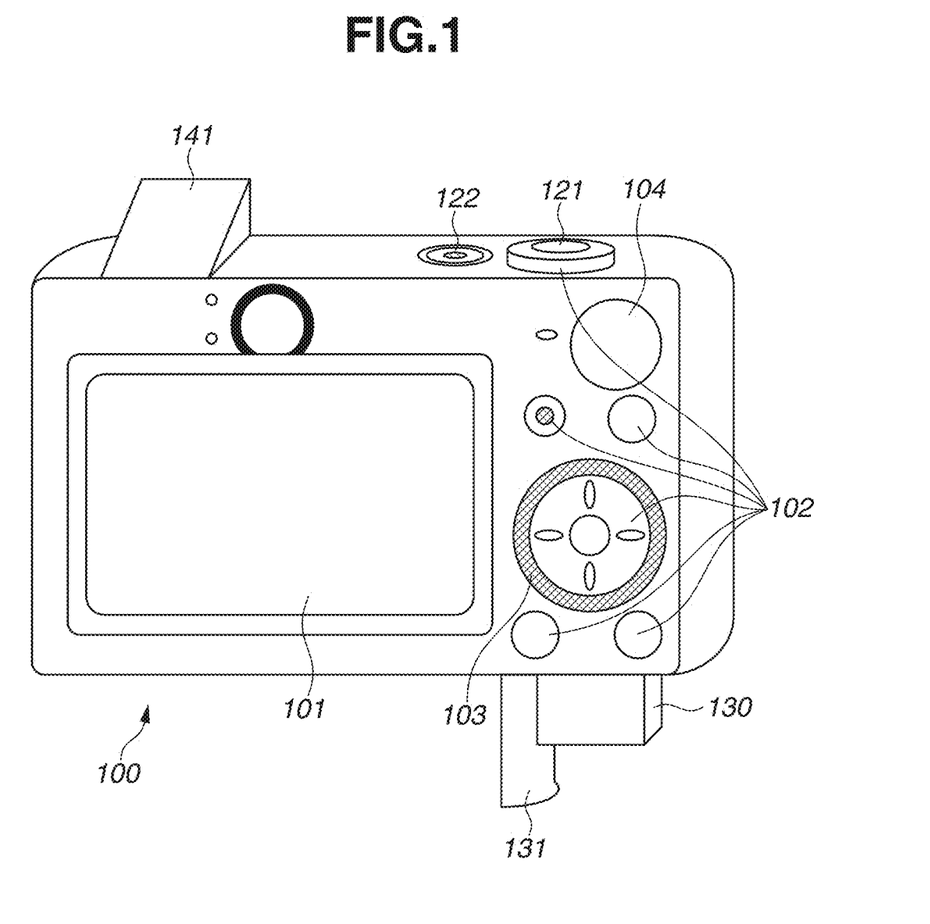
FIG. 1 is a rear face perspective diagram illustrating a schematic configuration of a digital camera according to an exemplary embodiment.

The first exemplary embodiment will be described. FIG. 1 is a rear face perspective diagram illustrating a schematic configuration of a digital camera according to the present exemplary embodiment.

A display unit 101 for displaying images and various kinds of information and an operation unit 102 configured of operation members such as various switches and buttons, which accepts various operations from the user, are arranged on a rear face of a digital camera 100. Further, a mode shifting switch 104 for shifting an image capturing mode and a controller wheel 103 rotationally operable are arranged on the rear face of the digital camera 100. A shutter button 121 for inputting an image capturing instruction, a power switch 122 for switching ON/OFF states of power of the digital camera 100, and a flash 141 for irradiating an object with flash light are arranged on an upper face of the digital camera 100.

The digital camera 100 can be connected to an external apparatus through wired or wireless communication to output image data (still image data or moving image data) to the external apparatus. A storage medium slot (not illustrated) openable/closable by a cover 131 is arranged on a lower face of the digital camera 100, and a storage medium 130 such as a memory card can be inserted to or removed from the storage medium slot.

The storage medium 130 stored in the storage medium slot can communicate with a system control unit 210 (see FIG. 2) of the digital camera 100. In addition, the storage medium 130 is not limited to the memory card configured to being inserted or removed to/from the storage medium slot, but may be a magnetic disk such as an optical disk or a hard disk. Further, the storage medium 130 may be built into a main body of the digital camera 100.

Figure 2:
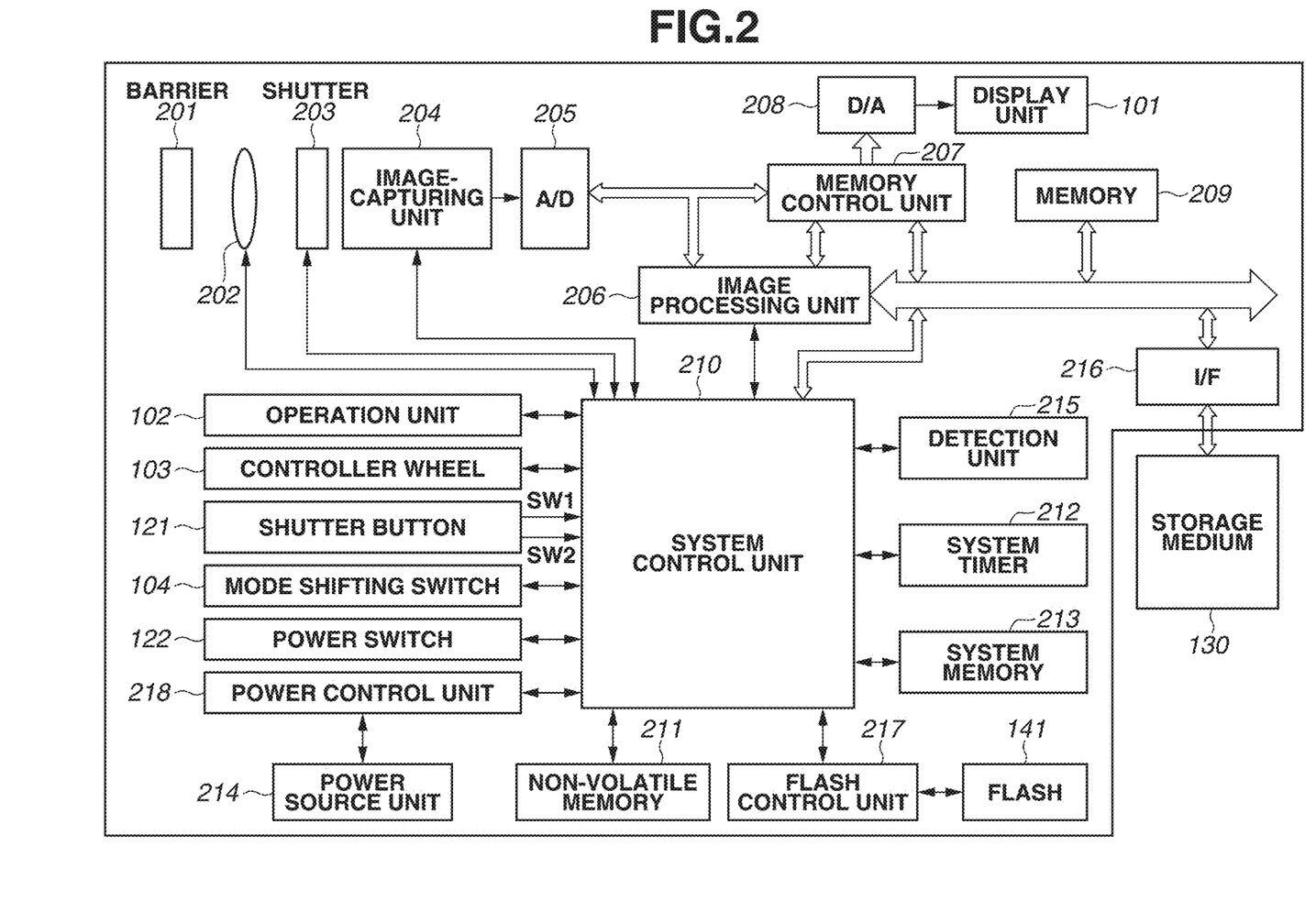
FIG. 2 is a block diagram illustrating a hardware configuration of the digital camera according to the exemplary embodiment.

FIG. 2 is a block diagram illustrating a hardware configuration of the digital camera 100. The digital camera 100 includes a barrier 201, an imaging lens 202, a shutter 203, and an image capturing unit 204. The barrier 201 covers an imaging optical system to prevent the imaging optical system from being contaminated or damaged. The imaging lens 202 is configured of a lens group including a zoom lens and a focus lens to constitute the imaging optical system. The shutter 203 includes an aperture function and adjusts an exposure amount with respect to the image capturing unit 204. The image capturing unit 204 is an image sensor which converts an optical image into an electric signal (analog signal). The image capturing unit 204 may be an image sensor such as a charge coupled device (CCD) sensor or a complementary metal-oxide semiconductor (CMOS) sensor having a Bayer array structure, in which pixels of red, green, and blue (RGB) are regularly arranged. In addition, the shutter 203 may be a mechanical shutter, or may be an electronic shutter which controls the accumulation time through reset timing control of the image sensor.

Alternatively, the image capturing unit 204 may be provided as a structure in which a plurality of photoelectric conversion portions can be arranged in a single pixel, which is configured to acquire a stereo image, so that the below described auto focus (AF) detection processing can be executed more quickly.

The digital camera 100 includes an analog-to-digital (A/D) conversion unit 205, an image processing unit 206, a memory control unit 207, a digital-to-analog (D/A) conversion unit 208, a memory 209, and a system control unit 210. An analog signal is output to the A/D conversion unit 205 from the image capturing unit 204. The A/D conversion unit 205 converts the acquired analog signal into image data consisting of a digital signal and outputs the image data to the image processing unit 206 or the memory control unit 207.

The image processing unit 206 executes correction processing such as pixel interpolation or shading correction, white balance processing, gamma correction processing, or color conversion processing with respect to image data acquired from the A/D conversion unit 205 or data acquired from the memory control unit 207. Further, the image processing unit 206 executes cutout (trimming) processing or scaling processing of an image to realize an electronic zoom function. Furthermore, the image processing unit 206 executes predetermined arithmetic processing by using image data of a captured image, and the system control unit 210 executes exposure control or range finding control based on the acquired arithmetic result. For example, auto-focus (AF) processing through a through-the-lens (TTL) method, auto-exposure (AE) processing, or pre-flash (EF) processing is executed by the system control unit 210. The image processing unit 206 executes predetermined arithmetic processing by using image data of a captured image, and the system control unit 210 executes auto-white balance (AWB) processing through the TTL method by using the acquired arithmetic result.

The image processing unit 206 includes an image composition processing circuit for compositing a panoramic image from a plurality of images and executing determination of the composition result. The image composition processing circuit can execute not only simple addition-average composition processing but also comparison lighten composition or comparison darken composition processing for generating a piece of image data by selecting a pixel having the brightest or darkest value in each area of composition-target image data. Further, the image composition processing circuit evaluates and determines a composition result based on a specific reference. For example, the image composition processing circuit determines that the composition processing has failed in a case where the number of composite images is less than a predetermined number or a length of the composite image is less than a reference value.

Furthermore, the image processing unit 206 includes a compression/decompression function of converting the image data acquired through the image capturing processing into data in an image format such as the Joint Photographic Experts Group (JPEG) format. In addition, the image processing unit 206 also includes a function for realizing template matching described below. Details of the template matching will be described below. In addition, a function of the image composition processing may be realized through software processing executed by the system control unit 210 in stead of being realized through the constituent element provided by the image processing unit 206.

The image data output from the A/D conversion unit 205 is written into the memory 209 via the image processing unit 206 and the memory control unit 207, or via the memory control unit 207. The memory 209 also serves as an image display memory (video memory) for storing image data displayed at the display unit 101. The memory 209 has a storage capacity configured to store a predetermined number of still images and panoramic images (wide-angle image), and a panoramic image composition result. In addition, the memory 209 can also be used as a work area for loading a program read out from a non-volatile memory 211 by the system control unit 210.

The image display data (digital data) stored in the memory 209 is transmitted to the D/A conversion unit 208. The D/A conversion unit 208 converts the received digital data into an analog signal to supply the analog signal to the display unit 101, so that an image is displayed at the display unit 101. The display unit 101 is a display device such as a liquid crystal display or an organic electro-luminescence (EL) display, at which an image is displayed based on the analog signal transmitted from the D/A conversion unit 208. The system control unit 210 switches an ON/OFF state of the image display at the display unit 101, and power consumption can be reduced by turning off the image displayed thereat. Further, a digital signal that is accumulated in the memory 209 from the image capturing unit 204 via the A/D conversion unit 205 is converted into an analog signal by the D/A conversion unit 208. Then, the analog signal is supplied to the display unit 101, so that images are sequentially displayed at the display unit 101. With this configuration, an electric view finder function for displaying a live view image can be realized.

The digital camera 100 includes a non-volatile memory 211, a system timer 212, a system memory 213, a detection unit 215, and a flash control unit 217. The non-volatile memory 211 is an electrically erasable/storable memory such as an electrically erasable programmable read-only memory (EEPROM) which stores a program executed by the system control unit 210 or a constant number used for operation. The non-volatile memory 211 includes an area for storing system information or an area for storing user setting information. The system control unit 210 reads and restores various kinds of information and settings stored in the non-volatile memory 211 when the digital camera 100 is activated.

The system control unit 210 includes a central processing unit (CPU), and controls a general operation of the digital camera 100 by executing various program codes stored in the non-volatile memory 211. In addition, a program and a constant number or a variable number used for operation, which are read out from the non-volatile memory 211 by the system control unit 210, are loaded onto the system memory 213. A random access memory (RAM) or a volatile memory may be used as the system memory 213. Further, the system control unit 210 controls the memory 209, the D/A conversion unit 208, and the display unit 101 to execute display control. The system timer 212 measures time used for various kinds of control or time of a built-in clock. The flash control unit 217 controls light emitted from the flash 141 based on brightness of an object. The detection unit 215 includes a gyroscope sensor and an acceleration sensor, and acquires angular velocity information, acceleration information and orientation information of the digital camera 100. The angular velocity information includes information about angular velocity and angular acceleration of the digital camera 100 at the time of capturing a panoramic image. The orientation information includes information about inclination of the digital camera 100 with respect to the horizontal direction.

The display unit 101, the operation unit 102, the controller wheel 103, the shutter button 121, the mode shifting switch 104, the power switch 122, and the flash 141 in FIG. 2 are the same as those described with reference to FIG. 1.

For example, various operation members which constitute the operation unit 102 are used for selecting various function icons displayed at the display unit 101, and the function is allocated for each situation when a predetermined function icon is selected. In other words, respective operation members of the operation unit 102 act as various function buttons. An end button, a return button, an image-feeding button, a jump button, a narrowing-down button, an attribute changing button, and a display (DISP) button can be given as examples of the function buttons. For example, when a menu button is pressed, a menu screen for executing various settings is displayed at the display unit 101. The user can intuitively execute setting operation by using the menu screen displayed at the display unit 101 and an up/down/right/left four-direction button or a set button.

In addition to the four-direction button, the controller wheel 103 as an operation member rotationally operable is also used for specifying a selection item. When the controller wheel 103 is rotationally operated, an electric pulse signal is generated based on an operation amount (a rotation angle or the number of rotations). The system control unit 210 analyzes the pulse signal to control the respective units of the digital camera 100.

The shutter button 121 includes a first switch SW1 and a second switch SW2. The first switch SW1 is ON when the shutter button 121 is operated halfway and brought into a half-pressed state. In the state, an image capturing preparation instruction signal is transmitted to the system control unit 210. The system control unit 210 receives the signal indicating the ON state of the first switch SW1 and starts executing processing such as AF processing, AE processing, AWB processing, or EF processing. The second switch SW2 is ON when the shutter button 121 is completely operated and brought into a full-pressed state. In the state, an image capturing start instruction signal is transmitted to the system control unit 210. The system control unit 210 receives the signal indicating the ON state of the second switch SW2 and executes a series of image capturing operations for reading a signal from the image capturing unit 204 and writing image data into the storage medium 130.

The mode shifting switch 104 is a switch for shifting the operation mode of the digital camera 100 among various modes such as a still image capturing mode, a moving image capturing mode, and a reproduction mode. The still image capturing mode includes a panoramic image capturing mode for composition of a panoramic image through panoramic image capturing in addition to an auto image capturing mode.

The digital camera 100 further includes a power unit 214 and a power control unit 218. The power unit 214 may be a primary battery such as an alkaline battery or a lithium battery, a secondary battery such as a nickel-cadmium (NiCd) battery, a nickel-metal hydride (NiMH) battery, or a lithium-ion (Li) battery, or an alternating-current (AC) adapter, which supplies power to the power control unit 218. The power control unit 218 detects the presence or absence of batteries to be mounted on the power unit 214, a battery type, or a remaining battery level, and supplies necessary voltage to respective units including the storage medium 130 for a necessary period of time based on the detection result and an instruction of the system control unit 210.

The digital camera 100 further includes a storage medium interface (I/F) 216 which enables the storage medium 130 to communicate with the system control unit 210 when the storage medium 130 is mounted on the storage medium slot (not illustrated). Details of the storage medium 130 has already been described with reference to FIG. 1, so that description thereof is omitted.

Figure 3:
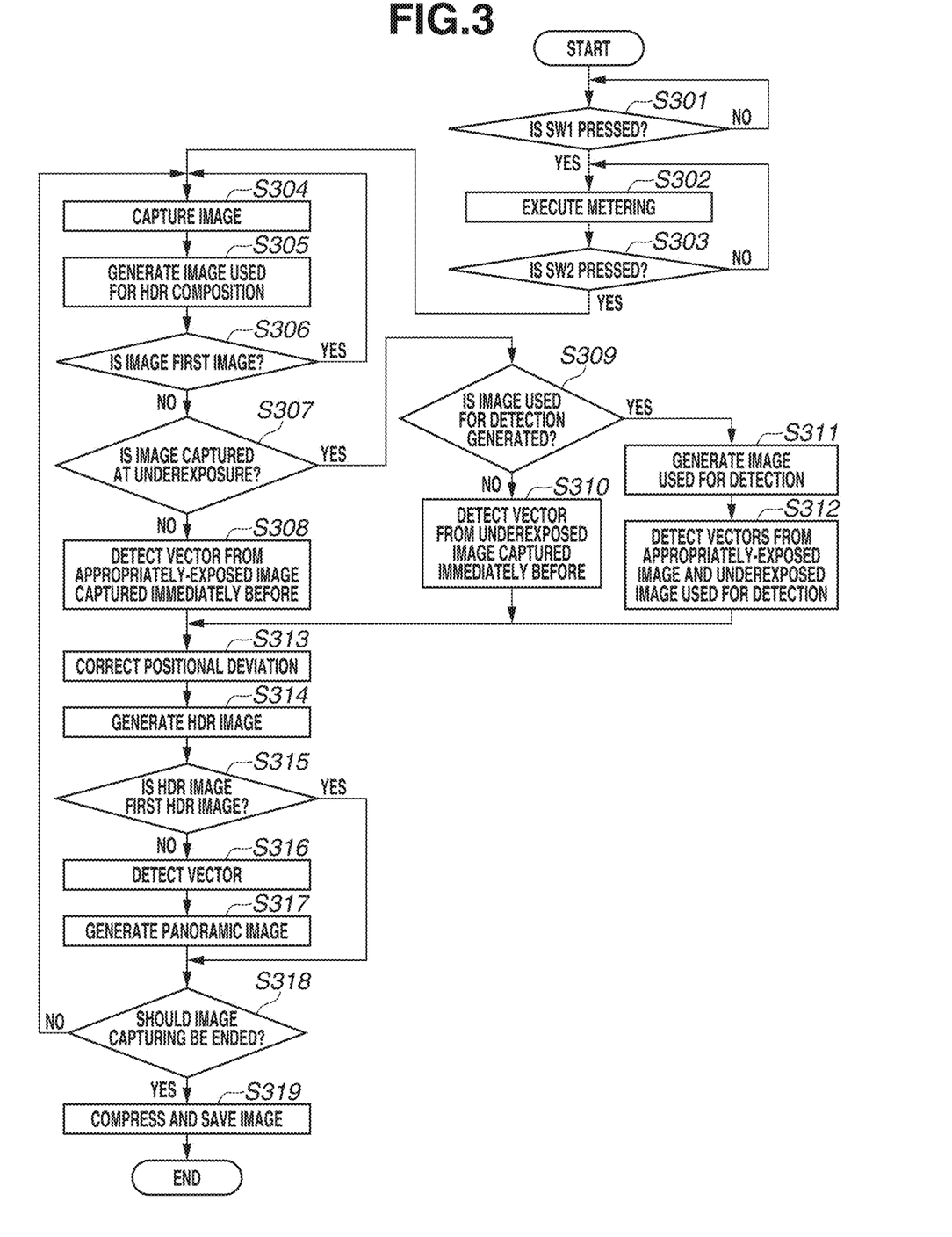
FIG. 3 is a flowchart illustrating panoramic image capturing processing according to a first exemplary embodiment.

FIG. 3 is a flowchart illustrating panoramic image capturing processing according to the present exemplary embodiment. The digital camera 100 executes a flow of the processing illustrated in FIG. 3 while performing the panning operation. Hereinafter, the present exemplary embodiment will be described with reference to the flowchart in FIG. 3.

In step S301, when the switch SW1 is pressed (YES in step S301), the processing proceeds to step S302. Otherwise, the processing returns to step S301.

In step S302, the image processing unit 206 uses the information about brightness of the object acquired through the imaging optical system to calculate an appropriate exposure amount, and determines an aperture, an accumulation time, and an international organization for standardization (ISO) sensitivity. The processing in step S302 is repeatedly executed until the switch SW2 is pressed.

In step S303, when the switch SW2 is pressed (YES in step S303), the processing proceeds to step S304. Otherwise, the processing returns to step S302. In step S304, the image capturing unit 204 executes image capturing. Specifically, based on the exposure amount calculated by the image processing unit 206 in step S302, the system control unit 210 sets an aperture to a target aperture. The system control unit 210 activates the flash 141 through the flash control unit 217 as necessary. The system control unit 210 drives a mirror arranged on the imaging optical system to form an image of the object on the image capturing unit 204. The system control unit 210 opens a front curtain (not illustrated) of the shutter 203 to form an object image on the image capturing unit 204, and subsequently closes a rear curtain (not illustrated) of the shutter 203 after the accumulation time determined in step S302. Through the above-described processing, light enters the image capturing unit 204 just for a period of the accumulation time.

Figure 4:
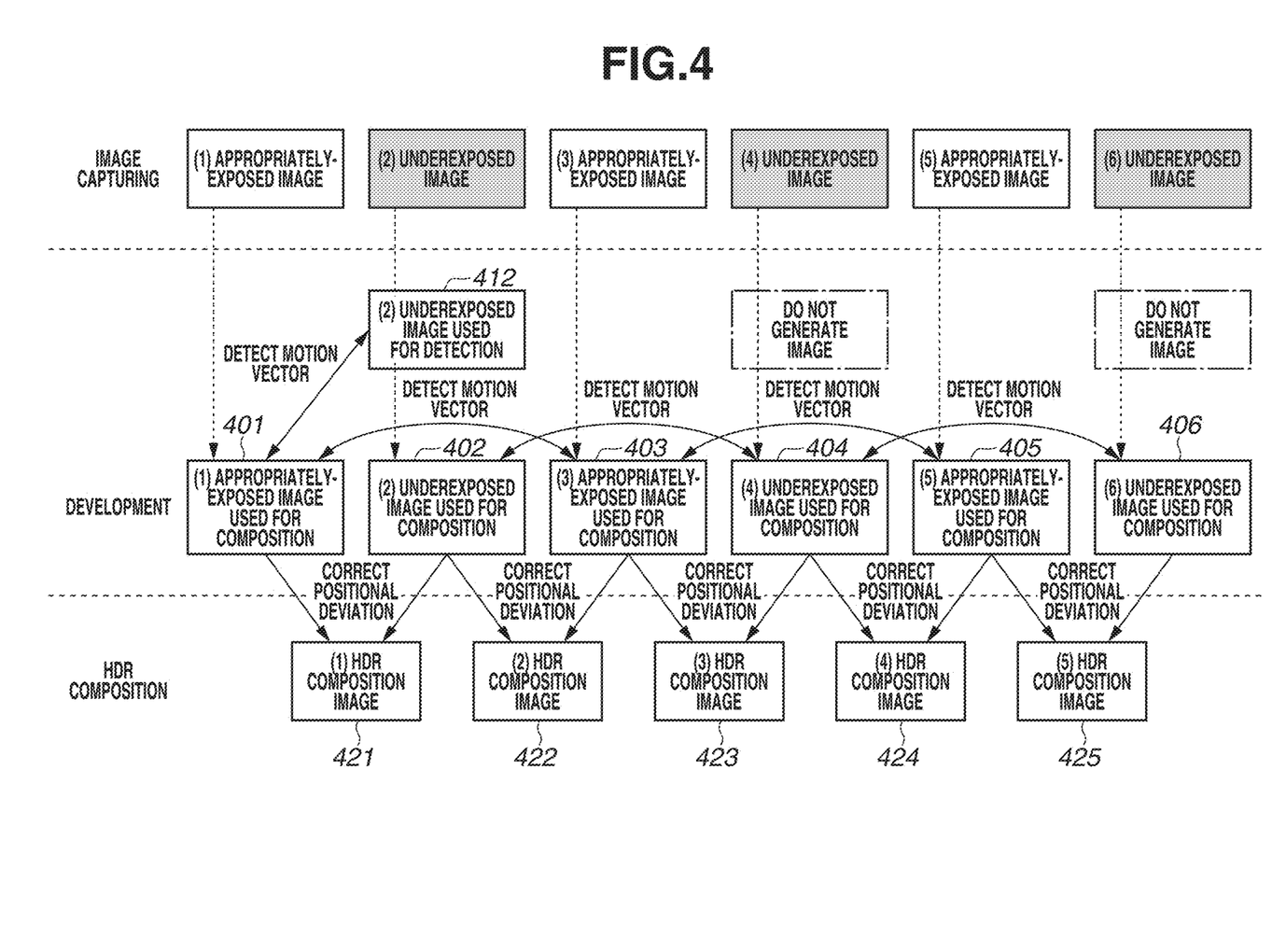
FIG. 4 is a diagram illustrating image capturing processing and image processing according to the first exemplary embodiment.

When image capturing is executed in step S304, the exposure is set in a predetermined rotational order. FIG. 4 is a diagram illustrating the image capturing processing and the image processing according to the present exemplary embodiment. FIG. 4 is a diagram illustrating a state where an appropriate exposure and an underexposure are rotationally set as the exposure at which the images are captured.

Next, in step S305, the image processing unit 206 generates an image used for HDR composition. The image used for HDR composition refers to an image to be used for generating an HDR image in step S314 described below. In step S305, the image processing unit 206 executes development for converting image data. At the same time, the image processing unit 206 may execute white balance processing or gamma correction processing based on a composition ratio of the HDR composition.

In step S306, the system control unit 210 determines whether the image captured in step S304 is the first image. If the image is the first image (YES in step S306), processing for compositing a panoramic image executed in steps S313 to S316 described below cannot be executed, so that the processing returns to step S304. If the image is not the first image (NO in step S306), the processing proceeds to step S307.

In step S307, the system control unit 210 determines whether the image captured in step S304 is captured at underexposure. If the image is captured at underexposure (YES in step S307), the processing proceeds to step S309. If the image is not captured at underexposure but captured at appropriate exposure (NO in step S307), the processing proceeds to step S308.

In step S308, the image processing unit 206 detects motion vectors from the image captured in step S304 and an appropriately-exposed image captured immediately before the image is captured. For example, in FIG. 4, the image processing unit 206 detects the motion vectors from images 401 and 403. A detection method of the motion vectors will be described below.

In step S309, the system control unit 210 determines whether to generate an image used for detection of the motion vector by using the image captured in step S304. The image used for detection of motion vectors refers to an image from which motion vectors are detected, and the detected motion vectors are used for positional adjustment when an HDR image is to be generated. For example, as illustrated in the second captured image in FIG. 4, in order to generate an HDR image, the image processing unit 206 multiplies the second captured image by gain and generates an image 412 used for detection having the exposure level that is the same as the appropriate exposure level. In the image capturing processing illustrated in FIG. 4, an image used for detection is generated with respect to only the second image (i.e., first underexposed captured image). However, the image used for detection may be generated for each of a specific number of captured images.

If the image used for detection is not generated (NO in step S309), the processing proceeds to step S310. In step S310, the image processing unit 206 detects motion vectors from respective images used for HDR composition of the image captured in step S304 and an underexposed image captured immediately before the image is captured. For example, in FIG. 4, the image processing unit 206 detects the motion vectors from an image 402 and an image 404.

If the image used for detection is generated (YES in step S309), the processing proceeds to step S311. In step S311, the image processing unit 206 multiplies the image by gain to generate the image used for detection. Then, the processing proceeds to step S312. In step S312, the image processing unit 206 uses the image used for detection that is generated in step S311 and an image used for HDR composition of the appropriately-exposed image captured immediately before the image is captured to detect the motion vectors. For example, in FIG. 4, the image processing unit 206 detects the motion vectors from an image 412 and an image 401.

Here, a detection method of motion vectors will be described in detail. As described above, template matching is employed as a detection method of the motion vectors. In the method, the motion vectors are detected through the following procedure.

First, the image processing unit 206 cuts out an area in a periphery of a central portion having less distortion from one of the images developed by the image processing unit 206. The image processing unit 206 divides the cutout area into small blocks having optional sizes. It is preferable that the image processing unit 206 set respective blocks to have a same size. Next, the image processing unit 206 sets search areas, each of which has a size larger than a size of each of the blocks, to the other developed image, at a position that is the same as the position of each of the set blocks. Lastly, in each of the search areas in the other developed image, the image processing unit 206 calculates a corresponding point at which the sum of absolute difference (hereinafter called as "SAD") of the luminance with respect to the block set at the beginning becomes a minimum value. The image processing unit 206 calculates a motion vector from the center of the block set at the beginning and the above-described corresponding point. In a case where a contrast of one area in the image is lower than a set threshold value, a motion vector detected from the one area is not used because an error of the detected motion vector is large. In order to calculate the above-described corresponding point, the image processing unit 206 may employ the sum of squared difference (hereinafter, called as "SSD") or the normalized cross correlation (hereinafter, called as "NCC") instead of the SAD.

Next, in step S313, the image processing unit 206 uses the detected motion vectors to correct positional deviation. Here, if the processing is described by taking the above-described template matching as an example, a conversion coefficient is calculated by using the detected motion vectors. For example, a projective conversion coefficient is used. However, the conversion coefficient is not limited to the projective conversion coefficient, and an affine conversion coefficient or a simplified conversion coefficient only for horizontal/vertical shifting may also be used. The image processing unit 206 can execute conversion by using the following equation (1).

$$I' = \begin{pmatrix} x' \\ y' \\ 1 \end{pmatrix} = AI = \begin{pmatrix} q & b & c \\ d & e & f \\ g & h & i \end{pmatrix} \begin{pmatrix} x \\ y \\ 1 \end{pmatrix} \quad (1)$$

In equation (1), (x', y') represents coordinates after executing conversion, and (x, y) represents coordinates before executing conversion. A matrix-A represents the above-described conversion coefficient. As described above, the image processing unit 206 calculates the affine coefficient by using the detected motion vectors.

In order to execute the below-described HDR composition, it is necessary to calculate an affine coefficient between adjacent images. In the present exemplary embodiment, most of the affine coefficients of adjacent images are not directly calculated, but calculated from the images of the same exposure. For example, in the image capturing processing illustrated in FIG. 4, the image processing unit 206 firstly creates an image used for detection of motion vectors from the second image, and directly calculates the affine coefficient of the first and the second images. However, creation of the image used for detection requires a memory capacity and processing time. Therefore, the image used for detection of motion vectors is not created with respect to the images subsequent to the second image, and the affine coefficient is indirectly calculated instead of calculating directly. As described above, the image processing unit 206 calculates the affine coefficient from the first and the third images. Because the first and the third images are captured at the same exposure level, the motion vector can be detected without newly creating the image used for detection, so that the affine coefficient can be calculated. Here, the image processing unit 206 can calculate the affine coefficient for correcting the positional deviation between the second and the third images by using the affine coefficient calculated from the first and the second images and the affine coefficient calculated from the first and the third images. Specifically, coordinates of pixels corresponding to the first to the third images are respectively expressed as "I1", "I2", and "I3". The affine coefficient of the first and the second images, the affine coefficient of the first and the third images, and the affine coefficient of the second and the third images are respectively expressed as "A21", "A31", and "A32". On the analogy of the above-described equation (1), the following equations (2) to (4) can be established.

$$I2 = A21 \cdot I1 \quad (2)$$

$$I3 = A31 \cdot I1 \quad (3)$$

$$I3 = A32 \cdot I2 \quad (4)$$

The following equation (5) is acquired from the above equations (2) to (4).

$$A32 = I3 \cdot I2^{-1} = A31 \cdot I1 \cdot (A21 \cdot I1)^{-1} = A31 \cdot A21^{-1} \quad (5)$$

Lastly, the image processing unit 206 can correct positional deviation of the images by applying the conversion coefficients calculated as described above to the respective pixels of adjacent images.

In step S314, the image processing unit 206 generates an HDR image from the image of which positional deviation has been corrected. Specifically, as illustrated in FIG. 4, the image processing unit 206 generates an HDR image 421 by using the image 401 and the image 402. Further, the image processing unit 206 generates an HDR image 422 by using the image 402 and the image 403. As described above, the image processing unit 206 generates an HDR image from adjacent images of which positional deviation has been corrected.

In step S315, the system control unit 210 determines whether the HDR image generated in step S314 is the first HDR image. If the image is the first HDR image (YES in step S315), a panoramic image cannot be generated. Therefore, the processing proceeds to step S318. If the image is not the first HDR image (NO in step S315), the processing proceeds to step S316.

In step S316, the image processing unit 206 detects the motion vectors used for generating a panoramic image by using the HDR image generated in step S314. The above-described template matching method may be used as a detection method of the motion vectors.

In step S317, the image processing unit 206 executes positional adjustment with respect to the HDR image generated in step S314 by using the motion vectors detected in step S316. A method of the positional adjustment may be similar to the method of correction of positional deviation in step S313. Thereafter, the image processing unit 206 generates a panoramic image by using the HDR images on which positional adjustment has been executed.

In step S318, the system control unit 210 determines whether to end the image capturing processing. The above determination may be made based on whether the switch SW2 is released, whether a capacity of the storage medium 130 has reached the upper limit, or whether the number of captured images has reached a predetermined value. If the image capturing processing should be ended (YES in step S318), the processing proceeds to step S319. If the image capturing processing should not be ended (NO in step S304), the processing returns to step S304.

In step S319, the image processing unit 206 compresses the panoramic image generated in step S317 and saves the composite image in the storage medium 130 in a general-purpose format such as the JPEG format.

In a conventional composition method of the HDR panoramic image, an image used for detection of motion vectors has to be newly generated with respect to an image that is not captured at an appropriate exposure. This may cause delay in processing because a great deal of processing time and a memory capacity are required. On the contrary, in the present exemplary embodiment, an image used for detection of motion vectors is generated only for a part of the images. As described above, a conversion coefficient between one image and an image indirectly adjacent to the one image is calculated with respect to the image other than the image for which the image used for detection of motion vectors has been generated. Through the above-described processing, the number of images used for detection of motion vectors can be significantly reduced by detecting the motion vectors from the images captured at a similar level of exposure. Therefore, it is possible to prevent delay in processing.

In a second exemplary embodiment, in comparison to the first exemplary embodiment, consideration is further given to the processing to be executed when the conversion coefficient cannot be detected. Hereinafter, the present exemplary embodiment will be described. Description will be omitted with respect to the configuration similar to the configuration described in the first exemplary embodiment.

Figure 5:
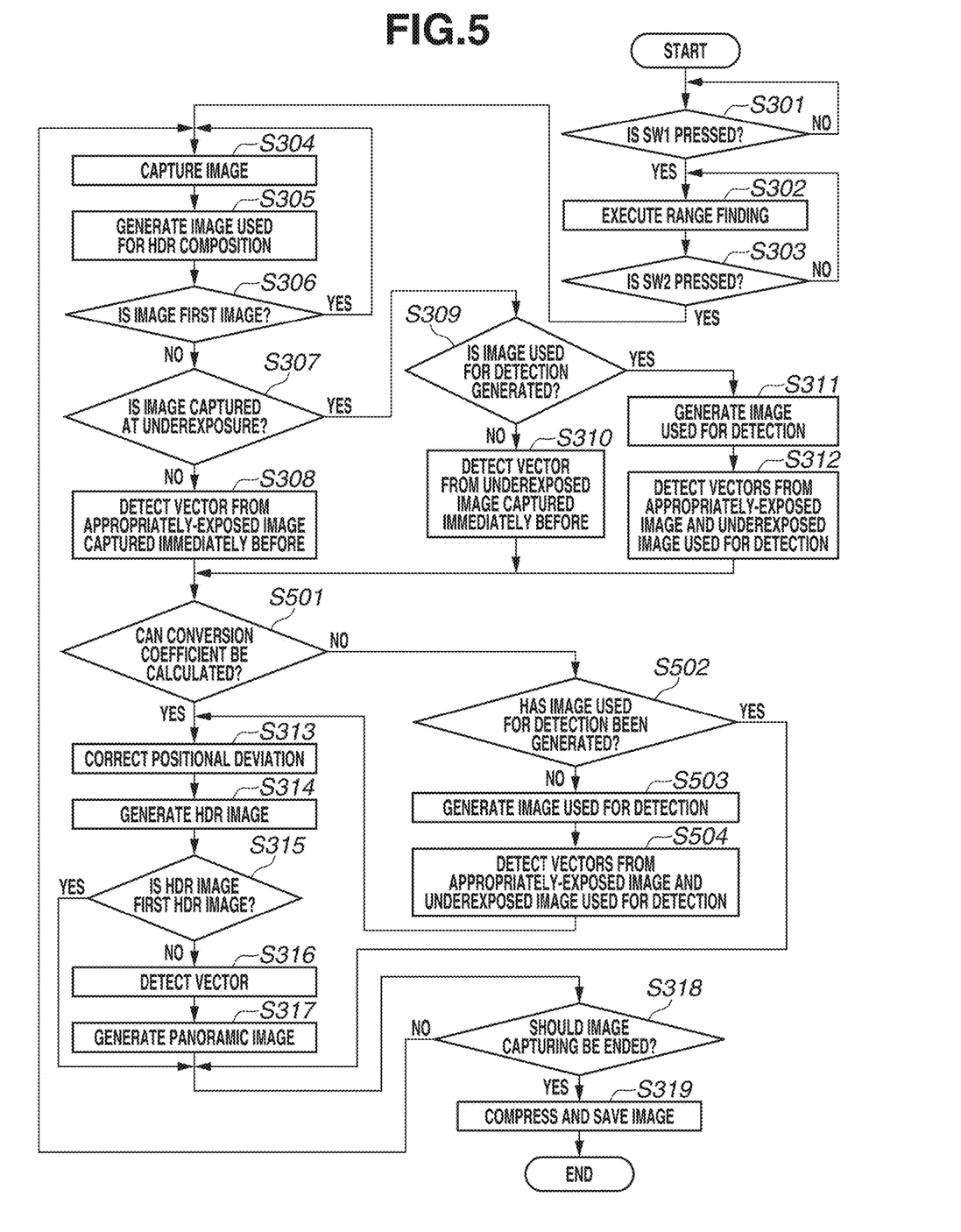
FIG. 5 is a flowchart illustrating panoramic image capturing processing according to a second exemplary embodiment.

FIG. 5 is a flowchart illustrating panoramic image capturing processing according to the present exemplary embodiment. Hereinafter, the present exemplary embodiment will be described with reference to the flowchart in FIG. 5.

In the first exemplary embodiment, the affine coefficient is calculated by using the motion vectors. Therefore, a method for calculating the affine coefficient through equation (1) has been described. Further, in the above-described calculation method, a motion vector calculated from an area having the contrast lower than a set threshold value is not used. Additionally, for example, the motion vector detected from an area such as a repetitive pattern area has a large error. Therefore, by executing setting, such motion vector may be prevented from being used for calculating the conversion coefficient. Moreover, when the motion vector has a certain value or less, or when the motion vector is considerably different from the gyroscope information detected by the detection unit 215, such motion vector should not be used in order to prevent an error.

However, there is a case where the conversion coefficient cannot be calculated if the number of motion vectors is a certain number or less. For example, with respect to the affine coefficient, at least three motion vectors which are not parallel to each other have to be detected in order to unambiguously calculate the affine coefficient A through the above-described equation (1). In other words, if only two motion vectors which are not parallel to each other are detected, the above-described conversion coefficient cannot be calculated, so that positional deviation cannot be corrected in step S313.

If three motion vectors can be detected, the affine coefficient can be unambiguously calculated. However, in consideration of the error, the number of motion vectors necessary for calculating the affine coefficient may be set to be more than three.

In consideration of the above-described problem, according to the method described in the present exemplary embodiment, a panoramic HDR image is generated without interrupting the processing flow in a case where the minimum number of motion vectors necessary for calculating the conversion coefficient cannot be acquired.

The processing in steps S301 to S312 is similar to the processing described in the first exemplary embodiment.

In step S501, the system control unit 210 determines whether the conversion coefficient can be calculated. Specifically, the system control unit 210 determines whether the number of motion vectors detected in steps S308, S310, and S312 is less than the minimum number necessary for calculating the conversion coefficient. If the system control unit 210 determines that the conversion coefficient can be calculated (YES in step S501), the processing proceeds to step S313. The processing in steps S313 to S319 is similar to the processing in the first exemplary embodiment. On the other hand, if the system control unit 210 determines that the conversion coefficient cannot be calculated (NO in step S501), the processing proceeds to step S502.

In step S502, with respect to the image from which the conversion coefficient cannot be calculated, the system control unit 210 determines whether the image processing unit 206 has already generated the image used for detection. Here, the image from which the conversion coefficient cannot be calculated is assumed to be the later captured image than another image in terms of chronological order, from among two images from which a minimum number of motion vectors necessary for calculating the conversion coefficient cannot be detected. As described in the first exemplary embodiment, the image used for detection is generated in step S311 according to a predetermined rule (e.g., one image used for detection is generated for a specific number of images). If the image used for detection has already been generated with respect to the image from which the conversion coefficient cannot be calculated (YES in step S502), the conversion coefficient cannot be calculated even if the below-described processing in step S503 is executed. Therefore, the processing step is skipped, and the processing proceeds to step S318.

In step S503, the image processing unit 206 generates an image used for detection corresponding to the image from which the conversion coefficient cannot be calculated. A generation method similar to the method described in step S311 may be used.

In step S504, the image processing unit 206 detects the motion vectors by using the image used for detection generated in step S503 and the image used for HDR composition of the appropriately-exposed image captured immediately before the image is captured.

Figure 6:
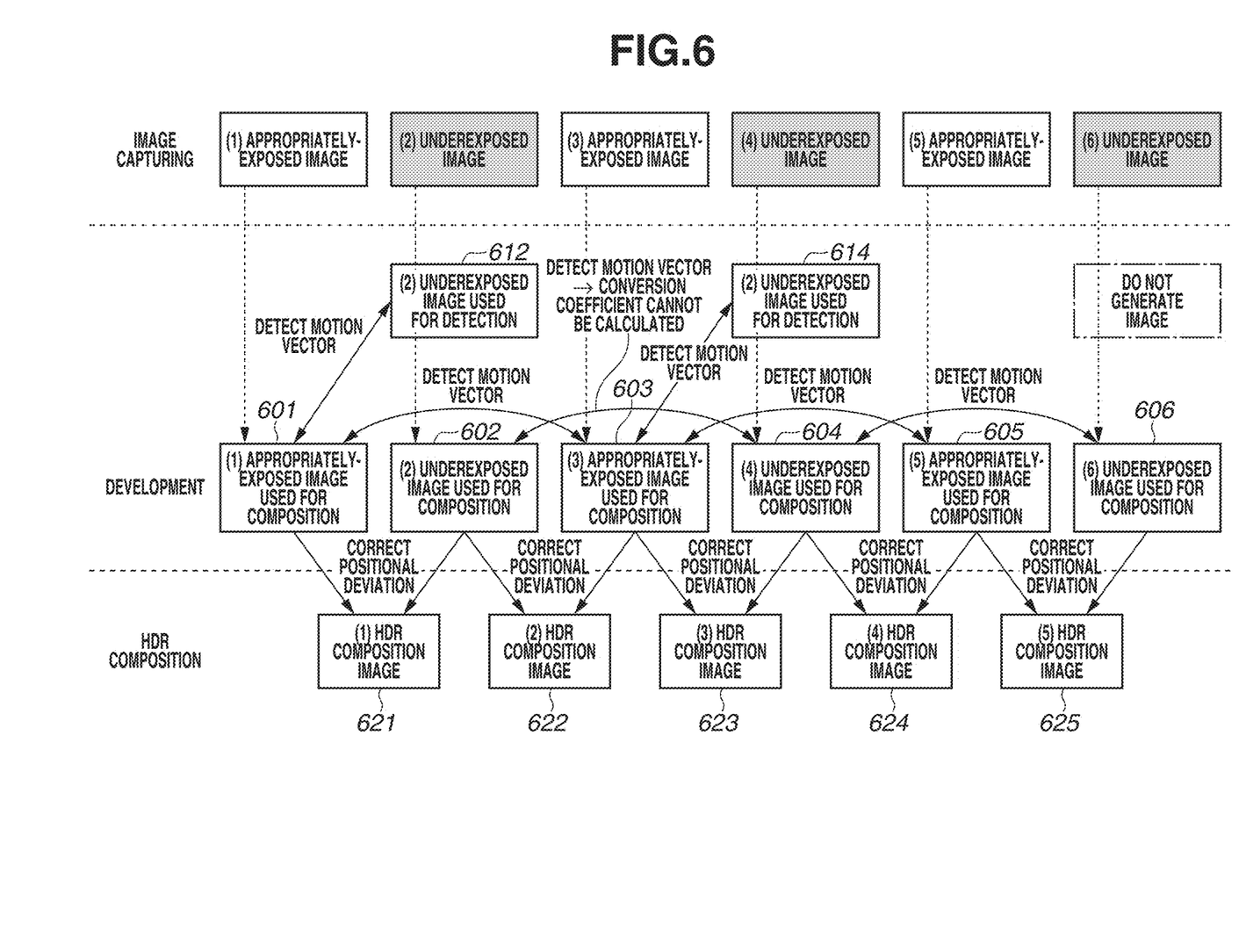
FIG. 6 is a diagram illustrating image capturing processing and image processing according to the second exemplary embodiment.

FIG. 6 is a diagram illustrating the image capturing processing and the image processing according to the present exemplary embodiment. The processing to be executed when the conversion coefficient cannot be calculated will be specifically described with reference to FIG. 6. Similar to the processing illustrated in FIG. 4, the image processing unit 206 creates an image 612 used for detection of motion vectors with respect to the second image. Next, the image processing unit 206 detects the motion vectors from an image 601 and the image 612, and detects the motion vectors from the image 601 and an image 603. Then, the image processing unit 206 detects the motion vectors from an image 602 and an image 604, and determines that the conversion coefficient cannot be calculated by using the motion vectors detected therefrom.

With respect to the image 604, the image processing unit 206 creates the image used for detection of motion vectors. In other words, the image processing unit 206 multiplies the image 604 by gain and generates an image 614 having an exposure level that is the same as that of the appropriately-exposed captured image.

Next, the image processing unit 206 detects the motion vectors from the image 603 and the image 614. The image processing unit 206 calculates the conversion coefficient by using the motion vectors detected therefrom, and corrects the positional deviation between the image 603 and the image 604 by using the calculated conversion coefficient. Subsequently, the image processing unit 206 detects the motion vectors from the image 603 and an image 605, and calculates the affine coefficient for correcting the positional deviation between the image 604 and the image 605 by using the detected motion vectors and the affine coefficient of the image 603 and the image 605.

In the present exemplary embodiment, the processing to be executed when the conversion coefficient cannot be calculated from the motion vectors is additionally executed. Therefore, in comparison to the first exemplary embodiment, it is possible to reduce occurrence of failure in composition of the HDR image.

Other Exemplary Embodiments

In the above-described exemplary embodiment, although a personal-use digital camera has been described as an exemplary embodiment, the disclosure is also applicable to a portable device, a smartphone, or a network camera connected to a server as long as the panoramic image capturing function and the composition function are included.

The disclosure can be realized in such a manner that a program for realizing one or more functions according to the above-described exemplary embodiments is supplied to a system or an apparatus via a network or a storage medium, so that one or more processors in a computer in the system or the apparatus read and execute the program. Further, the disclosure can also be realized with a circuit such as an application specific integrated circuit (ASIC) which realizes one or more functions.

According to the aspect of the disclosure, an image processing apparatus configured to reduce a memory capacity and time necessary for executing HDR panoramic composition can be provided.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-095660, filed May 17, 2018, which is hereby incorporated by reference herein in its entirety.

What is claimed is:

1. An image processing apparatus comprising:
   at least one memory configured to store instructions; and
   at least one processor in communication with the at least one memory, configured to execute the instructions to:
   execute first calculation in which a conversion coefficient for executing positional adjustment of images captured at a same exposure is calculated with respect to a plurality of images captured at different exposures;
   execute second calculation different from the first calculation, in which a conversion coefficient for executing positional adjustment of images captured at different exposures is calculated with respect to the plurality of images;
   execute positional adjustment with respect to the plurality of images; and
   execute composition with respect to the images on which the positional adjustment is executed to composite a panoramic image having a dynamic range and a viewing angle wider than a dynamic range and a viewing angle of the image,
   wherein, the at least one processor further executes the instructions to, in the second calculation, when calculating a conversion coefficient with respect to an image in a part of images from the plurality of images, newly generate an image used for detection having an exposure that is the same as an exposure of an image that is to be positionally adjusted to the image in the part of images by using an exposure of the image, and calculate a conversion coefficient by using the image used for detection, and to calculate a conversion coefficient for executing positional adjustment with respect to images other than the part of images from the plurality of images based on the conversion coefficient calculated in the first calculation.

2. The image processing apparatus according to claim 1, wherein the plurality of images is captured through a panning operation.

3. The image processing apparatus according to claim 1, wherein the at least one processor further executes the instruction to composite a plurality of composite images having a dynamic range wider than the dynamic range of the image to composite the panoramic image having a viewing angle wider than a viewing angle of the composite image by using the plurality of composite images.

4. The image processing apparatus according to claim 1, wherein, in the second calculation, the at least one processor further executes the instruction to calculate a conversion coefficient for executing positional adjustment of images other than the part of images from the plurality of images by using the conversion coefficient calculated by using the image used for detection, with respect to the image other than the part of images from the plurality of images.

5. The image processing apparatus according to claim 1, wherein the part of images at least include images captured in a predetermined order from the plurality of images.

6. The image processing apparatus according to claim 1, wherein, the part of images at least includes an image from which the conversion coefficient cannot be calculated in the first calculation, from the plurality of images.

7. The image processing apparatus according to claim 6,
   wherein the at least one processor further executes the instruction to calculate the conversion coefficient by detecting a motion vector from the image in the first calculation, and
   wherein the image from which the conversion coefficient cannot be calculated is an image from which motion vectors of a number less than a predetermined minimum number are detected in the first calculation.

8. The image processing apparatus according to claim 7, wherein the conversion coefficient is an affine coefficient, and the predetermined minimum number is three.

9. The image processing apparatus according to claim 1, wherein the plurality of images is captured at the exposures which rotationally are changed.

10. The image processing apparatus according to claim 1, wherein the at least one processor further executes the instruction to executes the positional adjustment with respect to each two images from the plurality of images by using the conversion coefficient for executing positional adjustment calculated in the second calculation.

11. An image pickup apparatus, comprising:
an image sensor configured to pick up a plurality of images;
at least one memory configured to store instructions; and
at least one processor in communication with the at least one memory, configured to execute the instructions to:
execute first calculation in which a conversion coefficient for executing positional adjustment of images captured at a same exposure is calculated with respect to a plurality of images captured at different exposures;
execute second calculation different from the first calculation, in which a conversion coefficient for executing positional adjustment of images captured at different exposures is calculated, with respect to the plurality of images;
execute positional adjustment with respect to the plurality of images; and
execute composition with respect to the images on which the positional adjustment is executed to composite a panoramic image having a dynamic range and a viewing angle wider than a dynamic range and a viewing angle of the image,
wherein, the at least one processor further executes the instructions to, in the second calculation, when calculating a conversion coefficient with respect to an image in a part of images from the plurality of images, newly generate an image used for detection having an exposure that is the same as an exposure of an image that is to be positionally adjusted to the image in the part of images by using an exposure of the image and calculate a conversion coefficient by using the image used for detection, and to calculate a conversion coefficient for executing positional adjustment based on the conversion coefficient calculated in the first calculation with respect to images other than the part of images from the plurality of images.

12. A control method to control an image processing apparatus, the method comprising:
executing first calculation in which a conversion coefficient for executing positional adjustment of images captured at a same exposure is calculated with respect to a plurality of images captured at different exposures;
executing second calculation different from the first calculation, in which a conversion coefficient for executing positional adjustment of images captured at different exposures is calculated with respect to the plurality of images;
executing positional adjustment with respect to the plurality of images; and
executing composition with respect to the images on which the positional adjustment is executed to composite a panoramic image having a dynamic range and a viewing angle wider than a dynamic range and a viewing angle of the image,
wherein, in the second calculation, when calculating a conversion coefficient with respect to an image in a part of images from the plurality of images, an image used for detection having an exposure that is the same as an exposure of an image that is to be positionally adjusted to the image is newly generated in the part of images by using an exposure of the image and calculate a conversion coefficient by using the image used for detection, and a conversion coefficient is calculated for executing positional adjustment based on the conversion coefficient calculated in the first calculation with respect to images other than the part of images from the plurality of images.

13. A non-transitory computer-readable storage medium storing instructions that cause a computer to execute a method for controlling an image processing apparatus, the method comprising:
executing first calculation in which a conversion coefficient for executing positional adjustment of images captured at a same exposure is calculated with respect to a plurality of images captured at different exposures;
executing second calculation different from the first calculation, in which a conversion coefficient for executing positional adjustment of images captured at different exposures is calculated with respect to the plurality of images;
executing positional adjustment with respect to the plurality of images; and executing composition with respect to the images on which the positional adjustment is executed to composite a panoramic image having a dynamic range and a viewing angle wider than a dynamic range and a viewing angle of the image,
wherein, in the second calculation, when calculating a conversion coefficient with respect to an image in a part of images from the plurality of images, an image used for detection having an exposure that is the same as an exposure of an image that is to be positionally adjusted to the image is newly generated in the part of images by using an exposure of the image and calculate a conversion coefficient by using the image used for detection, and a conversion coefficient is calculated for executing positional adjustment based on the conversion coefficient calculated in the first calculation with respect to images other than the part of images from the plurality of images.

* * * * *